Jan. 5, 1932.  H. A. WEAVER  1,839,429
TREAD STRIP FORMING MACHINE
Filed Sept. 20, 1929  3 Sheets-Sheet 3
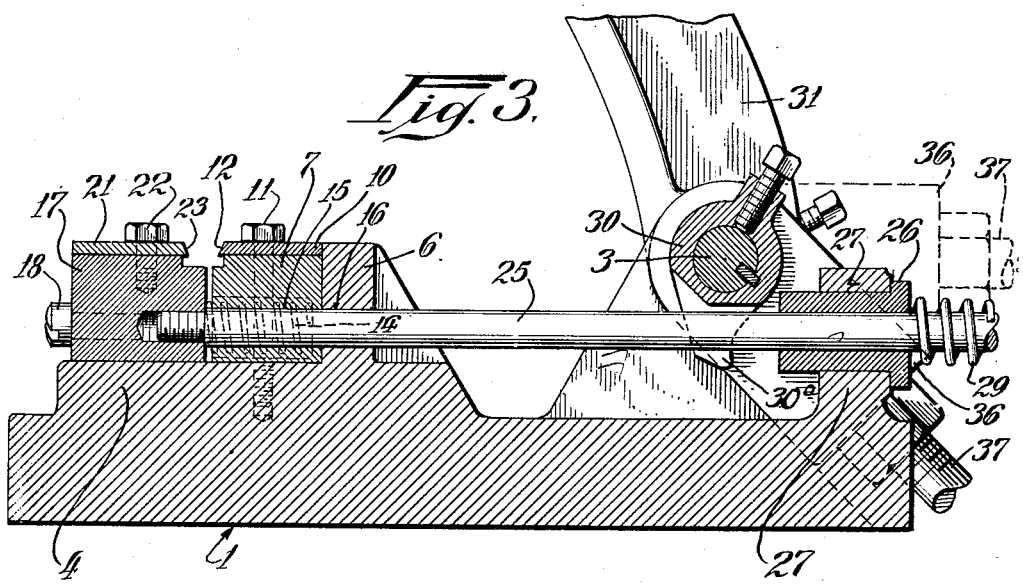
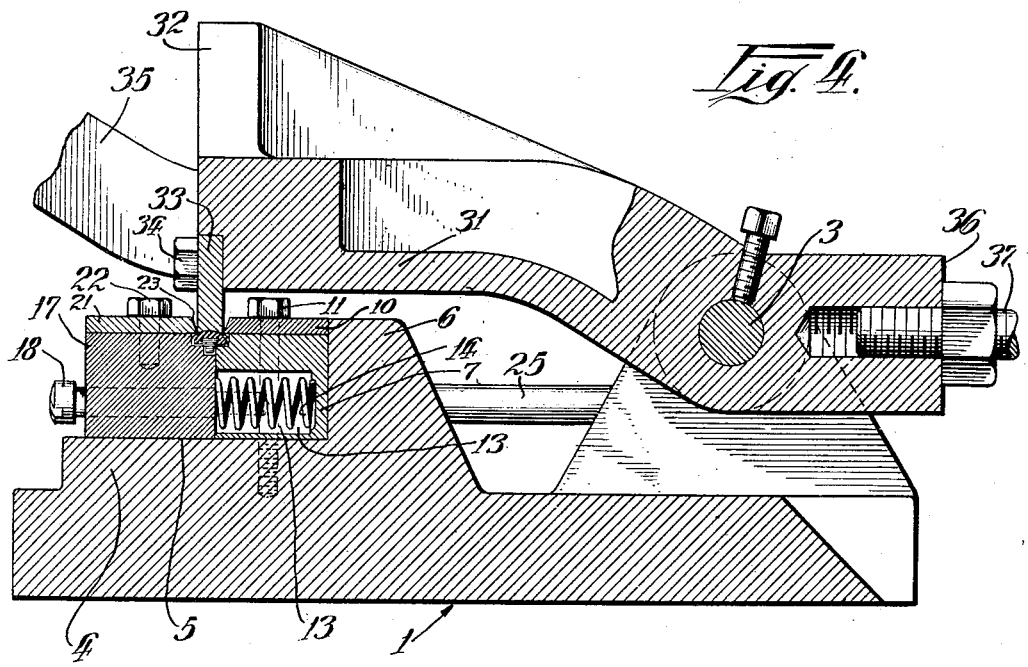
Inventor:
Harry A. Weaver.
By: Arthur M<sup>c</sup>Wilson
Atty.

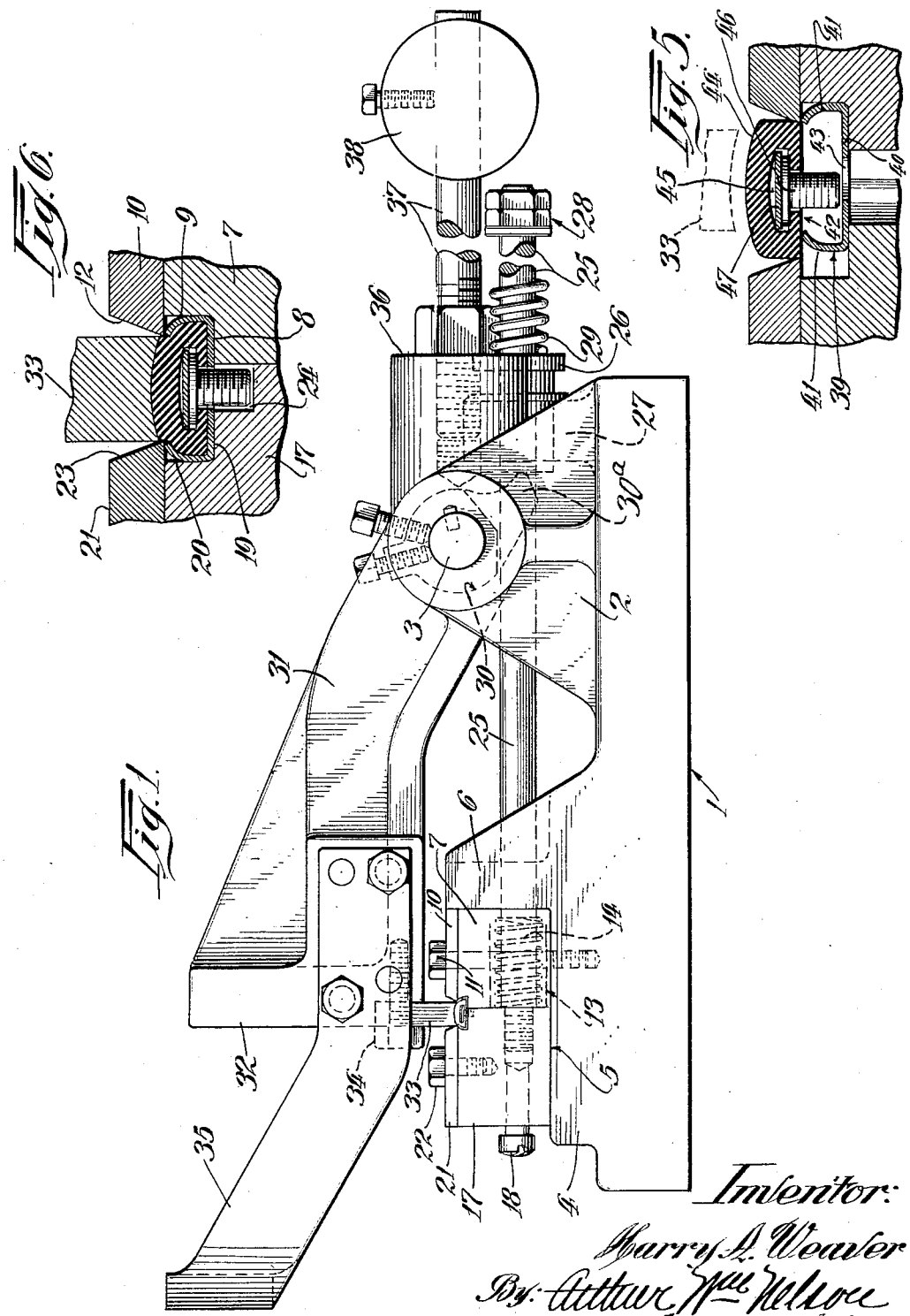

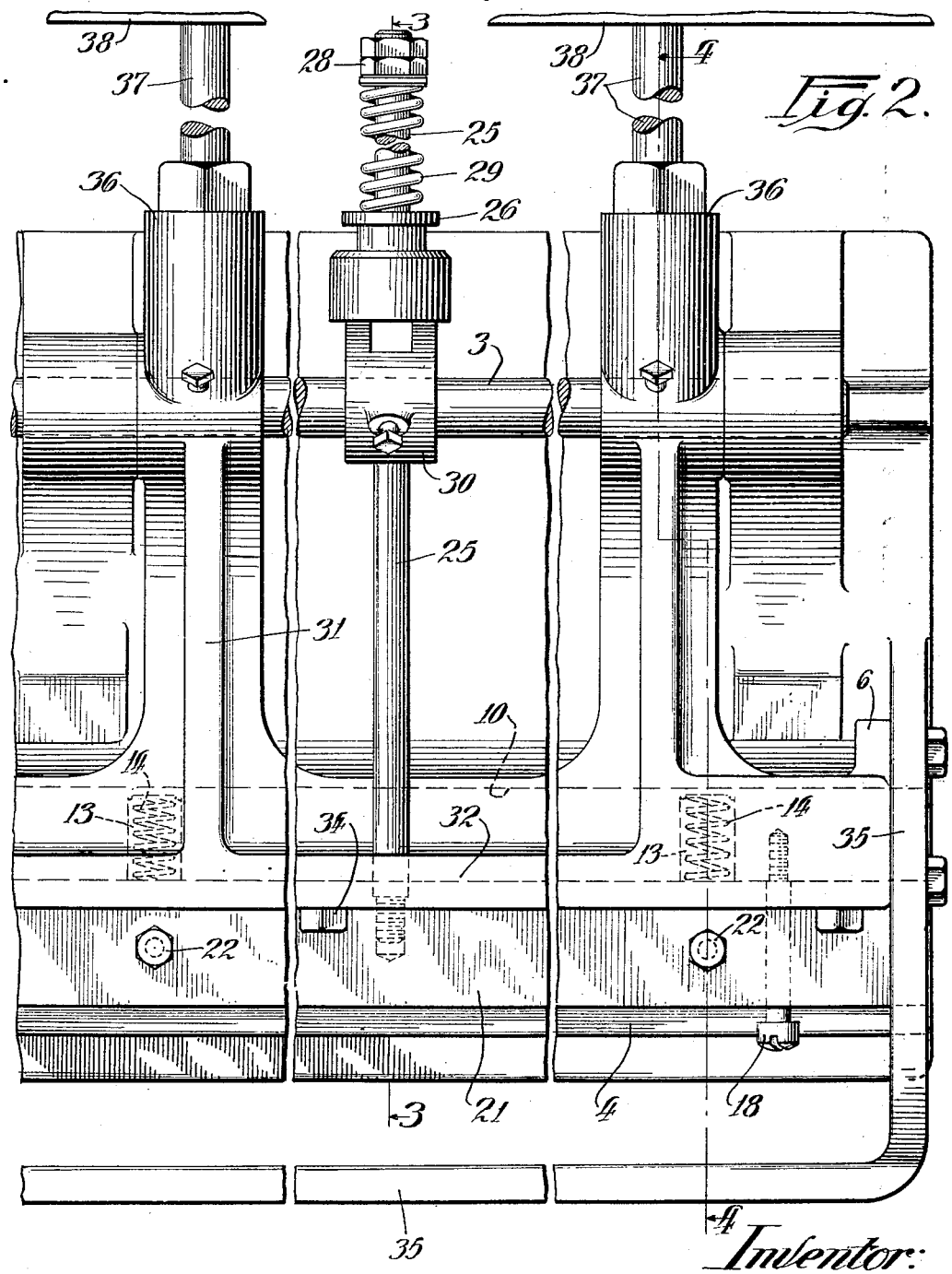

Patented Jan. 5, 1932

1,839,429

UNITED STATES PATENT OFFICE

HARRY A. WEAVER, OF INDIANAPOLIS, INDIANA, ASSIGNOR TO MANNING & CO., OF CHICAGO, ILLINOIS, A CORPORATION OF ILLINOIS

TREAD STRIP FORMING MACHINE

Application filed September 20, 1929. Serial No. 393,918.

This invention relates to improvements in tread strip forming machines and it consists of the matters hereinafter described and more particularly pointed out in the appended claims.

The tread strip produced by my improved machine comprises a metallic channel having a restricted inlet mouth or slot and a rubber strip which is inserted lengthwise through said slot into said channel while under compression. Thus the natural expansive action of the rubber strip assists in holding it in place in the channel with a part thereof extending beyond said slot to form a tread surface. Such a tread strip is of advantage in forming an anti slip tread surface upon automobile running boards and upon the stairs of dwellings and other buildings.

The primary object of the invention is to provide a simple and efficient machine for inserting a length of rubber or other compressible strip material, longitudinally through the slot of an associated channel into the interior thereof in a manner leaving a portion of said strip extending above the channel to form a tread surface.

Another object of the invention is to provide a machine of this kind, which operates to first laterally compress the rubber strip while in a position above the channel mouth and then to push or force said compressed rubber strip down through the channel slot and into said channel where it tends to expand back into its normal condition.

These objects of the invention as well as others together with the many advantages thereof will more fully appear as I proceed with my specification.

In the drawings:—

Fig. 1 is a view in side elevation of a tread strip forming machine embodying one form of my invention.

Fig. 2 is a top plan view thereof with parts broken away whereby the invention may be better illustrated.

Fig. 3 is a transverse vertical sectional view thru the machine as taken on the line 3—3 of Fig. 2.

Fig. 4 is another transverse vertical sectional view through the machine as taken on the line 4—4 of Fig. 2.

Fig. 5 is a detail vertical sectional view on an enlarged scale through the channel receiving blocks and coacting means for laterally compressing the rubber strip associated with the channel.

Fig. 6 is a view similar to Fig. 5 with the parts in a changed relation.

My improved machine includes a substantially flat, horizontally disposed, rectangular base 1 adapted to be mounted upon a suitable support. Said base is wider than it is deep from front to rear, and rising therefrom near the rear corners thereof are bearing standards 2—2 in which a laterally extending, horizontally disposed shaft 3 is suitably journalled. At the front of the base is a part 4 of greater thickness which provides a flat topped bed 5 with an upright shoulder 6 at its rear that extends from one side to the other of the base.

7 indicates an elongated block of rectangular cross section seated on the bed 5 up against the shoulder 6. The top front most corner of said block is rabbeted to provide a ledge 8 and an upright shoulder 9 at the rear thereof. On the top of said block is a bar 10 and lag bolts 11 pass downwardly through the bar and block into the base to secure said parts rigidly together. The front marginal portion of said bar overhangs the ledge 8 and there has a bevelled edge 12. In said elongated block and opening through the front thereof, is a plurality of recesses 13 each of which contains a spring 14 the purpose of which will presently appear. There is also provided in said block, horizontally disposed, transversely extending openings 15 which register with like openings 16 in the shoulder 6.

Associated with the block 7 fixed upon the bed 5, is a second block 17, of a similar cross section. Said second block is capable of a sliding movement on said bed toward and away from the fixed block 7 and pins 18 which are secured at one end in said block 7 and extend through the block 17, provide a guide therefor in its movement upon the bed. The movable block 17 is rabbeted at its top rear most corner to provide a ledge 19 and an upright shoulder 20. On the top of said movable block is a bar 21 which is secured thereto by lag screws 22. The rear marginal part of said bar which is bevelled as at 23 overhangs the ledge 19 and in the rear of said block are provided vertically disposed recesses 24 the purpose of which will presently appear.

Movement is imparted to said block 17 by means of horizontally disposed rods 25 which are fixed at their front ends in said block and have sliding bearings near said ends in the openings 15 and 16 of the block 7 and shoulder 6 respectively. The rear end of each rod slides through a bushing 26 in turn having a sliding movement in an ear 27 rising from the base 1 at points between the bearing standards 2—2. On the extreme rear end of each rod are nuts and washers 28 and surrounding a part of each rod between the associated bushing 26 and said nuts and washers is a helical expansion spring 29.

On the shaft 3 before mentioned, above each rod 25 is fixed a cam 30 having parts 30ª—30ª adapted to straddle the associated rod and to engage the front end of the bushing 26. To impart a rocking actuating movement to said shaft I provide a substantially U shaped frame having side arms 31—31 and a member 32 connecting the front ends thereof. Said member is adapted to overhang the fixed block 7 and is rabbeted along its bottom front edge to receive a presser or pusher bar 33 secured in place by lag screws 34. The bottom surface of this bar is concaved as best shown in Fig. 6. To swing the said frame up or down in the actuation thereof, I secure to the arms 31 thereof a U shaped lever 35. The arms 31—31 have rear extensions 36 in each of which is secured a rod 37 to receive a counter weight 38.

In the operation of the machine, when a downward pull is exerted upon the U shaped lever 35, the shaft 3 is caused to rock and bring the parts 30ª—30ª of each cam into engagement with the front end of the associated bushing 26. This will move the bushings 26 rearwardly on the associated rods 25 and will through the springs 29 impart a rearward movement to said rods. As said rods are fixed at their front ends to the movable block 17 it is apparent that said block is moved toward the fixed block 7. In this movement of the block 17, the springs 14 in the recess 13 of the fixed block 7 are compressed.

From the above, it is apparent that the connections between the cams 30 and rods 25 are not rigid ones but are yielding ones, produced through the action of the springs 29. In the upward swing of the U shaped lever 35, the springs 14 operate to move the block 17 away from the block 7 and this will of course cause the bushings 26 to be moved back into the associated bearing ears 27 through the action of the springs 29, the weights 38 of course counterbalancing the frame arms 31 and connecting bar 32.

The tread strip which my improved machine is designed to produce, includes a sheet metal channel member 39 having a bottom wall or web 40 and side walls or flanges 41—41 respectively, the top marginal parts of said side walls being bent inwardly toward each other to form a somewhat restricted inlet or mouth 42 therefor, as best shown in Fig. 5. In the bottom wall of the channel are longitudinally spaced openings 43. Associated with the channel is a strip of rubber 44 or other suitable material of substantially a rectangular cross section. In said strip is a longitudinally extending T shaped groove 45 to receive a plurality of flat headed screws 46 and a metallic protecting strip 47 disposed above said heads.

In operation, with the movable block 17 in its position furthest removed from the fixed block 7, a channel strip is inserted in place between said blocks with the bottom wall 40 thereof resting on the ledges 8 and 19 respectively of said blocks. The channel is then moved rearwardly to engage the shoulder 9 of the block 7 and the rear flange of the channel is then disposed beneath the overhanging margin of the bar 10 as best shown in Fig. 5. With the channel disposed in this position, a strip of rubber 44 with the screws 46 and strip 47 in place therein is then applied upon the top of the channel with the screws 46 lining up with the openings 43 in the bottom wall of the channel, which openings in turn line up with the notches or recesses in the movable block 17.

When the parts of the tread strip as a whole are positioned as described, the U shaped lever arm is grasped and swung downwardly. This will rock the shaft 3 and the cam parts 30ª thereon will engage their respective bushings 26 and push the same rearwardly. The springs 29 will then urge the rods 25 rearwardly and will cause the block 17 to move in a guided manner toward the block 7. The bars 10 and 21, of said blocks in the initial movement of the arm 35 will engage the rubber strip 44 between them and will compress the same from opposite sides into a dimension permitting it to pass through the restricted mouth 42 of the channel. In the final movement of the parts the pusher bar 33 will engage the compressed rubber strip from above and will force or push it downwardly through said mouth into the channel. With the flat headed screws 46 positioned in the strip as mentioned, they will in said downward movement of the strip, pass through the openings 43 in the bottom wall of the channel. When said strip is in the channel it will expand to snugly fill the channel with a portion of its top projecting a suitable distance above the plane of the top edges of the channel flanges 41 as best shown in Fig. 6.

When the arm 35 is swung upwardly, the block 17 will move outwardly away from the block 7 when the completed tread strip may be removed from the machine which is now ready to receive a similar channel and rubber strip to produce the next tread strip.

With my improved machine, the entire length of the rubber strip is first compressed laterally and is then pushed down into the channel. In this manner the parts of the tread strip are easily and quickly assembled. The parts of the machine are comparatively few in number and are strong and rigid so that they will not readily give out in use.

While in describing my invention I have referred in detail to the form, arrangement and construction of the various parts thereof, the same is to be considered merely as illustrative so that I do not wish to be limited thereto except as may be specifically set forth in the appended claims.

I claim as my invention:

1. A machine of the kind described embodying therein, means providing a support for a channel member having a restricted inlet, and means for compressing in a direction other than endwise the entire length of a strip positioned adjacent the restricted mouth of the channel and for moving said compressed length of strip through said restricted mouth into said channel.

2. A machine of the kind described embodying therein, means providing a support for a channel member having a restricted inlet, and means for compressing in a direction other than endwise the entire length of a strip positioned above the restricted mouth of the channel and for moving said compressed length of strip downwardly through said mouth into said channel.

3. A machine of the kind described embodying therein, a pair of relatively movable members providing a support for a channel member having a restricted inlet, means associated with said members and operable in the relative movement thereof toward each other to laterally compress a strip positioned adjacent said inlet and other means for engaging the compressed strip for moving it through said restricted inlet into said channel.

4. A machine of the kind described embodying therein, a pair of members relatively movable in a plane toward and away from each other and providing a support for a channel member having a restricted inlet, means associated with said members and operable in the relative movement thereof toward each other to laterally compress a strip positioned adjacent said channel member and a third member movable substantially at a right angle to said first mentioned plane for forcing said compressed strip through said restricted inlet into said channel.

5. A machine of the kind described embodying therein, means providing a support for a channel member having a restricted inlet, means associated with said support and relatively movable toward and away from each other to laterally compress a strip positioned above said channel and a member movable toward and away from said last mentioned means for engaging the laterally compressed strip for forcing it through said inlet into said channel.

6. A machine of the kind described embodying therein, means providing a support for a channel member having a restricted inlet, means associated with said support and relatively movable toward and away from each other to laterally compress a strip positioned above said channel and a member movable in an arc about a fixed axis for engaging said laterally compressed strip for forcing it through said inlet into said channel.

7. A machine of the kind described embodying therein, means providing a support for a channel member having a restricted inlet, means associated with said support and relatively movable toward and away from each other to laterally compress a strip positioned above said channel, a shaft spaced from and parallel with said means, a member swingable about said shaft as an axis to engage said compressed strip for forcing it through said inlet into said channel and means actuated in the initial part of said swinging movement of said member and operatively connected to said relatively movable means for actuating the same.

8. A machine of the kind described embodying therein, a base, a pair of parallel block members on said base mounted for a relative movement toward and away from each other, actuating rods operatively connected to one of said members, a main operating member, yielding means adapted to be engaged by said operating member in the initial part of its movement for moving one of said blocks toward the other and means carried by said main operating member and operable in the final part of the movement thereof to move into a position between said block members as they approach each other.

9. A machine of the kind described embodying therein, a base, a pair of parallel block members mounted on said base for a relative movement toward and away from each other, a shaft journalled on said base parallel with said blocks, actuating rods fixed at one end to one of said blocks and slidable through the other of said blocks, a bushing through which each of said rods slide, spring means between said bushing and the associated ends of said rods, a main operating member fixed to said shaft, means operable in the initial part of the swinging movement of said operating member in one direction for engaging said bushing to actuate said rods and means operable in the final part of said swinging movement of said operating member in said one direction to move into a position between said blocks.

10. A machine of the kind described embodying therein, a base, a block fixed on said base, a second block movable on the base toward and away from the fixed block, a shaft parallel with said blocks, a counterbalanced operating member on said shaft, rods secured at one end to said second block and extending toward and beyond said shaft, yielding means operable in the initial part of the swinging movement of the operating member in one direction to cause said rods to move said second block toward the fixed block, a member carried by said operating member and coacting with said blocks in the final part of the swinging movement of the operating member and means operable in a swinging movement of said operating member in the other direction for moving said second block away from the fixed block.

In testimony whereof, I have hereunto set my hand, this 17 day of Sept., 1929.

HARRY A. WEAVER.